US012665338B2

(12) United States Patent
Zhou et al.

(10) Patent No.: US 12,665,338 B2
(45) Date of Patent: Jun. 23, 2026

(54) TYPE-C PLUG TERMINAL, MANUFACTURING METHOD THEREOF, CONNECTOR AND CHARGER

(71) Applicant: Dongguan Aohai Technology Co., Ltd., Dongguan (CN)

(72) Inventors: Chaohua Zhou, Dongguan (CN); Xiaochun Zhang, Dongguan (CN); Xiugen Guo, Dongguan (CN); Yanhua Luo, Dongguan (CN)

(73) Assignee: Dongguan Aohai Technology Co., Ltd., Dongguan (CN)

( * ) Notice: Subject to any disclaimer, the term of this patent is extended or adjusted under 35 U.S.C. 154(b) by 235 days.

(21) Appl. No.: 18/287,944

(22) PCT Filed: Jun. 20, 2023

(86) PCT No.: PCT/CN2023/101241
§ 371 (c)(1),
(2) Date: Oct. 23, 2023

(87) PCT Pub. No.: WO2024/216742
PCT Pub. Date: Oct. 24, 2024

(65) Prior Publication Data

US 2025/0087922 A1 Mar. 13, 2025

(30) Foreign Application Priority Data

Apr. 17, 2023 (CN) ........................ 202310412237.X

(51) Int. Cl.
*H01R 13/40* (2006.01)
*H01R 13/405* (2006.01)
(Continued)

(52) U.S. Cl.
CPC ....... *H01R 13/405* (2013.01); *H01R 13/5202* (2013.01); *H01R 43/24* (2013.01)

(58) Field of Classification Search
CPC .. H01R 13/405; H01R 13/5202; H01R 43/24; H01R 13/6594; H01R 13/6471;
(Continued)

(56) References Cited

U.S. PATENT DOCUMENTS 10,008,793 B2 * 6/2018 Ju .......................... H01R 24/00
10,720,732 B2 * 7/2020 Zhao .................. H01R 13/6594
(Continued)

FOREIGN PATENT DOCUMENTS

CN 205543329 U 8/2016
CN 106099618 A 11/2016
(Continued)

OTHER PUBLICATIONS

European Search Report of European Patent Application No. 23754693.2 issued on Oct. 9, 2024.

*Primary Examiner* — Truc T Nguyen

(57) ABSTRACT

Provided are a Type-C plug terminal, manufacturing method thereof, connector and charger. The terminal comprises a first terminal module, a second terminal module and a terminal housing; the first terminal module is injection molded by using a first terminal element and a middle clip; the second terminal module is injection molded by using a second terminal element; and the terminal housing is injection molded on the stacked first terminal module and the second terminal module, and a part of the first terminal module extending out of the terminal housing forms N first PINs, a part of the second terminal module extending out of the terminal housing forms N second PINs. The installation mode is that the terminal formed by the first and second terminal module is directly plugged into the PCB board through connecting terminal, which can shorten the technological process of product manufacturing and the assembly production line accordingly.

11 Claims, 5 Drawing Sheets

(51) Int. Cl.
*H01R 13/52* (2006.01)
*H01R 43/24* (2006.01)

(58) Field of Classification Search
CPC ...... H01R 12/724; H01R 24/60; H01R 13/02; H01R 12/58; H01R 43/16; H01R 43/205; B29L 2031/3481; B29L 2031/36; B29C 45/14639; H02J 7/0042
See application file for complete search history.

(56) References Cited

U.S. PATENT DOCUMENTS

| | | | | |
|---|---|---|---|---|
| 2016/0013592 | A1* | 1/2016 | Kao | H01R 13/6471 439/607.55 |
| 2016/0141806 | A1* | 5/2016 | Guo | H01R 13/504 29/883 |
| 2017/0201046 | A1* | 7/2017 | Zhao | H01R 13/26 |
| 2018/0062319 | A1 | 3/2018 | Chang et al. | |
| 2019/0115678 | A1* | 4/2019 | Zhao | H01R 13/6471 |
| 2019/0252830 | A1* | 8/2019 | Zhao | H01R 13/642 |
| 2020/0212642 | A1* | 7/2020 | Zhao | H01R 13/02 |
| 2020/0235515 | A1* | 7/2020 | Tsai | H01R 13/641 |
| 2020/0235535 | A1* | 7/2020 | Tsai | H01R 13/42 |
| 2020/0412067 | A1* | 12/2020 | Xu | H01R 13/5219 |
| 2021/0257789 | A1* | 8/2021 | Chang | H01R 13/502 |
| 2021/0288424 | A1 | 9/2021 | Zhao et al. | |
| 2024/0106137 | A1* | 3/2024 | Jeon | H01R 12/57 |

FOREIGN PATENT DOCUMENTS

| | | | |
|---|---|---|---|
| CN | 106856276 | A | 6/2017 |
| CN | 206271916 | U | 6/2017 |
| CN | 207925746 | U | 9/2018 |
| CN | 109428211 | A | 3/2019 |
| CN | 110137727 | A | 8/2019 |
| CN | 112736538 | A | 4/2021 |
| CN | 213584239 | U | 6/2021 |
| CN | 213753132 | U | 7/2021 |
| CN | 115810966 | A | 3/2023 |
| CN | 220382339 | U | 1/2024 |
| JP | 2021068535 | A | 4/2021 |
| KR | 101954278 | B1 | 3/2019 |

* cited by examiner

| | | |
|---|---|---|
| A1 | GND | Ground PIN, acting as ground wire (negative electrode) |
| A2 | SSTXp1 | High speed pin |
| A3 | SSTXn1 | High speed pin |
| A4 | Vbus | Power PIN |
| A5 | CC1 | Monitoring pin |
| A6 | D+ | Meet USB 2.0G specification, positive electrode |
| A7 | D- | Meet USB 2.0G specification, negative electrode |
| A8 | SBU1 | Main function: audio |
| A9 | Vbus | Power PIN |
| A10 | SSTXn2 | High speed pin |
| A11 | SSTXp2 | High speed pin |
| A12 | GND | Ground PIN, acting as ground wire (negative electrode) |
| B12 | GND | Ground PIN, acting as ground wire (negative electrode) |
| B11 | SSRXp1 | High speed pin |
| B10 | SSRXn1 | High speed pin |
| B9 | Vbus | Power PIN |
| B8 | SBU2 | Main function: audio |
| B7 | D- | Meet USB 2.0G specification, negative electrode |
| B6 | D+ | Meet USB 2.0G specification, positive electrode. |
| B5 | CC2 | Monitoring pin |
| B4 | Vbus | Power PIN |
| B3 | SSRXn2 | High speed pin |
| B2 | SSRXp2 | High speed pin |
| B1 | GND | Ground PIN, acting as ground wire (negative electrode) |

Fig. 4

TYPE-C PLUG TERMINAL, MANUFACTURING METHOD THEREOF, CONNECTOR AND CHARGER

The present application claims the benefit of Chinese Patent Application No. 202310412237.X, filed on Apr. 17, 2023, titled "Type-C plug terminal, manufacturing method thereof, connector and charge", the contents of which are incorporated herein by reference in their entirety.

TECHNICAL FIELD

The application belongs to the technical field of Type-C, and particularly relates to a Type-C plug terminal, a manufacturing method thereof, a connector and a charger.

BACKGROUND

In response to the European Union ENIEC standard, the terminal charging port is called Type-C. During the research on the related technologies of Type-C, the inventors found that all the currently available Type-Cs are chip-mounted. As shown in FIG. 5, in manufacturing, solder paste is brushed and then reflowed, and multilayer board is adopted for matching PCB board, which leads to high production cost and complicated process, affecting production efficiency.

SUMMARY

Aiming at the problems that the existing Type-C plug terminal has high manufacturing cost and complex technology, which affects the production efficiency, the application provides a Type-C plug terminal.

The Type-C plug terminal includes a first terminal module, a second terminal module and a terminal housing;

- the first terminal module is injection molded by using a first terminal element and a middle clip;
- the second terminal module is injection molded by using a second terminal element; and
- the terminal housing is injection molded on the stacked first terminal module and the second terminal module, and a part of the first terminal module extending out of the terminal housing forms N first PINs, a part of the second terminal module extending out of the terminal housing forms N second PINs, the N first PINs and the N second PINs are arranged in a display mode to form a connection terminal for plugging into a PCB board, and N≥3.

A manufacturing method of a Type-C plug terminal, includes the following steps:

- injection molding a first terminal element and a middle clip to obtain a first terminal module;
- injection molding a second terminal element to obtain a second terminal module;
- injection molding the stacked first terminal module and the second terminal module to obtain a terminal housing, and a part of the first terminal module extending out of the terminal housing forms N first PINs, a part of the second terminal module extending out of the terminal housing forms N second PINs, the N first PINs and the N second PINs are arranged in a display mode to form a connection terminal for plugging into a PCB board, and N≥3.

A Type-C connector, including the Type-C plug terminal described above, a protective case and a PCB board;

- the protective case is provided with a plug pin, and the plug pin is plugged onto the PCB board to form an accommodating space; and
- the Type-C plug terminal is assembled in the accommodating space, and the connection terminal of the Type-C plug terminal is plugged onto the PCB board.

A charger, including the Type-C plug terminal described above.

In this application, the first terminal module is injection molded by using a first terminal element and a middle clip, and the second terminal module is injection molded by using a second terminal element. The first terminal element and the second terminal element are used as the metal conductive parts inside the Type-C plug terminal, the middle clip includes a connecting part and carrier part. The connecting part is arranged between the first terminal element and the second terminal element, which plays a separating role. As a handheld part, the carrier part provides convenience for user to pick up the Type-C plug terminal. The first terminal module and the second terminal module are matched and combined to form a complete Type-C plug terminal. Injection molding the stacked first terminal module and the second terminal module to obtain a terminal housing, and a part of the first terminal module extending out of the terminal housing forms N first PINs, a part of the second terminal module extending out of the terminal housing forms N second PINs, the N first PINs and the N second PINs are arranged in a display mode to form a connection terminal for plugging into a PCB board. In this way, the installation mode of the application is that the Type-C plug terminal formed by the first terminal module and the second terminal module is directly plugged into the PCB board through the connecting terminal, which is simpler and more convenient compared with the chip-mounted mode, and can shorten the technological process of product manufacturing and the assembly production line accordingly. Meanwhile, the usage of PCB board is reduced, thus achieving the effect of saving resources.

BRIEF DESCRIPTION OF THE DRAWINGS

FIG. 4 is a table of a Type-C plug terminal 24 pins of the present application;

Figure 1:
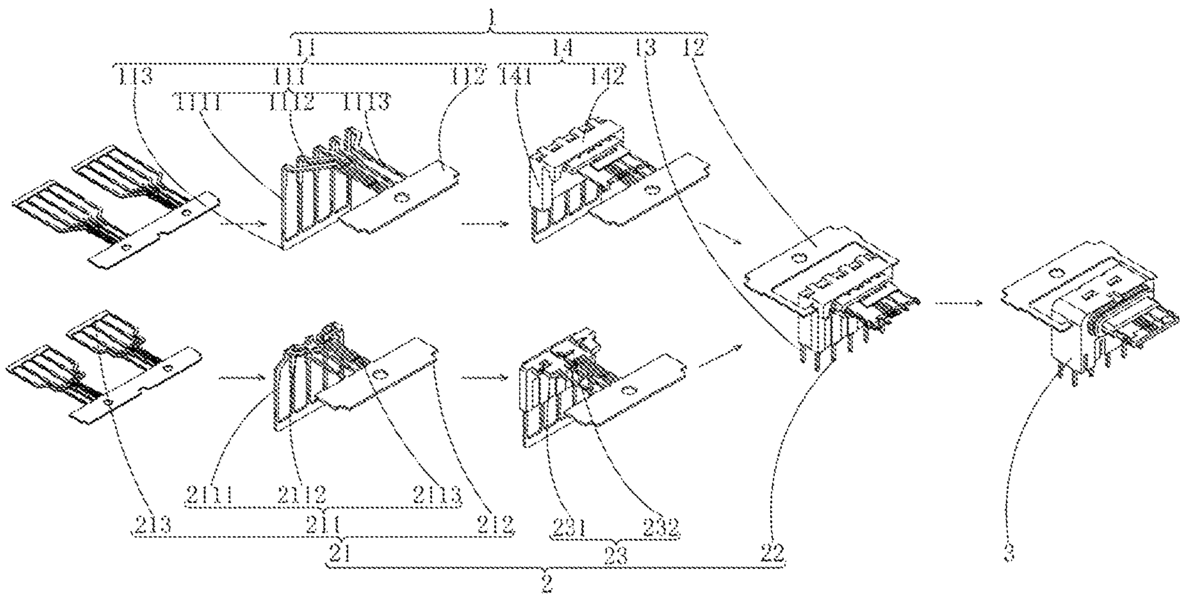
FIG. 1 is a manufacturing step diagram of a Type-C plug terminal of the present application.

1. First terminal module; 11. First terminal element; 111. First conductive lead; 1111. First connecting part; 1112. First bending part; 1113. Second connecting part; 112. First carrier; 113. Second carrier; 12. Middle clip; 13. First pin; 14. First module housing; 141. First injection molded part; 142. Second injection molded part; 2. Second terminal module; 21. Second terminal element; 211. Second conductive lead; 2111. Third connecting part; 2112. Second bending part; 2113. Fourth connecting part; 212. Third carrier; 213. Fourth carrier; 22. Second pin; 23. Second module housing; 231. Third injection molded part; 232. Fourth injection molded part; 3. Terminal housing; 4. PCB board; 41. First mounting hole; 42. Second mounting hole; 5. Protective case; 51. Plug pin; 52. U-shaped housing; 521. First U-shaped plate; 522. Second U-shaped plate; 523. Third U-shaped plate; 53. Inner sleeve; 6. Waterproof component; 61. Waterproof housing; 62. Waterproof ring.

DETAILED DESCRIPTION OF DISCLOSED EMBODIMENTS

In order to make the technical problems, technical solutions and beneficial effects of the present application more clear, the application will be further explained in detail below with reference to the drawings and embodiments. It should be understood that the specific embodiments described here are only used to illustrate the application, rather than to limit the application.

In the description of the present application, it is to be understood that the terms "longitudinal", "radial", "length", "width", "thickness", "upper", "lower", "front", "rear", "left", "right", "vertical", "horizontal", "top", "bottom", "inner", "outer", and the like indicate an orientation or positional relationship based on that shown in the drawings, and are for convenience of description and simplicity of description only, not intended to indicate or imply that the indicated devices or elements must have a particular orientation, be constructed and operated in a particular orientation, and are therefore not to be construed as limiting the present application.

In the description of the present application, unless otherwise stated, "multiple" means two or more. In the description of the present application, it should be noted that unless otherwise specified and defined, the terms "installation", "connected with" and "connected to" should be understood in a broad sense. For example, they may be fixedly connected, detachably connected or integrally connected, or may be mechanically connected or electrically connected, or may be directly connected or indirectly connected through an intermediate medium. Or it may be internal communication of two elements. For those of ordinary skill in the art, the specific meanings of the above terms in the present application may be understood in specific situations.

The embodiments of this application provide a Type-C plug terminal, as shown in FIG. 1, which includes a first terminal module 1, a second terminal module 2 and a terminal housing 3; the first terminal module 1 is injection molded by using a first terminal element 11 and a middle clip 12; the second terminal module 2 is injection molded by using a second terminal element 21; and the terminal housing 3 is injection molded on the stacked first terminal module 1 and the second terminal module 2, and a part of the first terminal module 1 extending out of the terminal housing 3 forms N first PINs 13, a part of the second terminal module 2 extending out of the terminal housing 3 forms N second PINs 22, the N first PINs 13 and the N second PINs 22 are arranged in a display mode to form a connection terminal for plugging into a PCB board 4, and N≥3.

Figure 5:
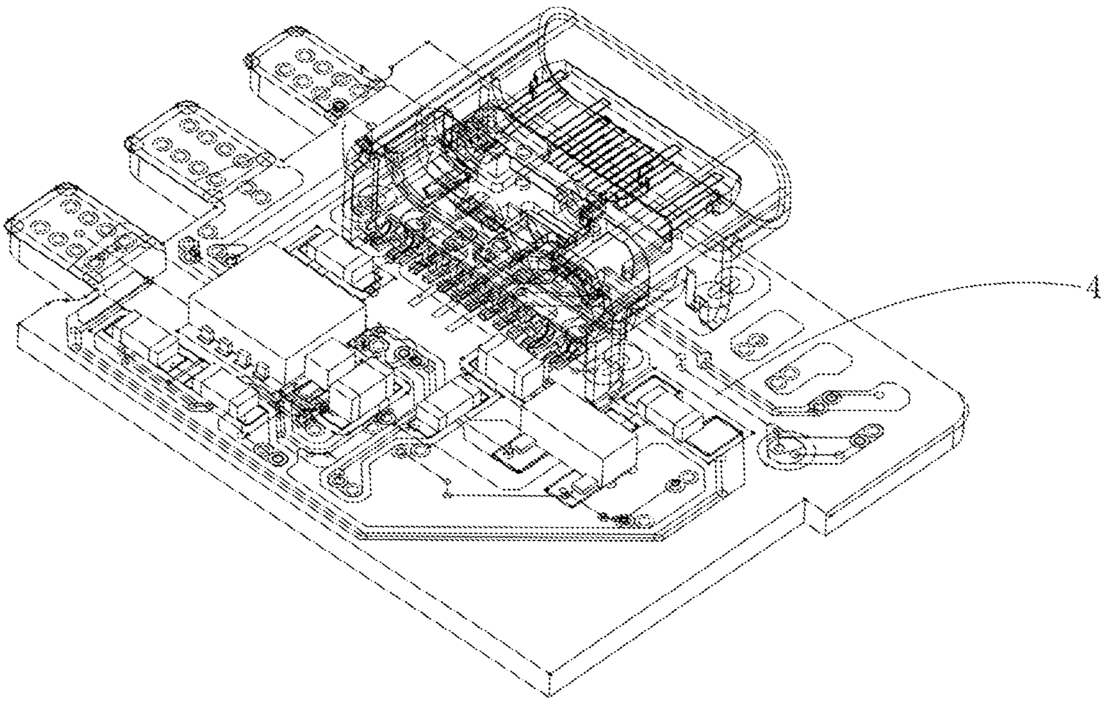
FIG. 5 is a structural diagram of the existing chip-mounted Type-C connector.

As an embodiment, referring to FIG. 5, it can be seen that all Type-C in the market at present are chip-mounted. The connection mode between terminal module and PCB board is: solder paste is brushed and then reflowed, and multilayer board is adopted for matching PCB board. This leads to high production cost and complicated process, thus affecting production efficiency. In this embodiment, the Type-C plug terminal includes a first terminal module 1, a second terminal module 2 and a terminal housing 3. The first terminal module 1 is injection molded by using a first terminal element 11 and a middle clip 12, and the second terminal module 2 is injection molded by using a second terminal element 21. The first terminal element 11 and the second terminal element 21 are used as the metal conductive parts inside the Type-C plug terminal, the middle clip 12 includes a connecting part and carrier part. The connecting part is arranged between the first terminal element 11 and the second terminal element 21, which plays a separating role. As a handheld part, the carrier part provides convenience for user to pick up the Type-C plug terminal. The first terminal module 1 and the second terminal module 2 are matched and combined to form a complete Type-C plug terminal. Injection molding the stacked first terminal module 1 and the second terminal module 2 to obtain a terminal housing 3, and a part of the first terminal module 1 extending out of the terminal housing 3 forms N first PINs 13, a part of the second terminal module 2 extending out of the terminal housing 3 forms N second PINs 22, the N first PINs 13 and the N second PINs 22 are arranged in a display mode to form a connection terminal for plugging into a PCB board 4. In this way, the installation mode of the application is that the Type-C plug terminal formed by the first terminal module 1 and the second terminal module 2 is directly plugged into the PCB board 4 through the connecting terminal, which is simpler and more convenient compared with the chip-mounted mode, and can shorten the technological process of product manufacturing and the assembly production line accordingly. Meanwhile, the usage of PCB board 4 is reduced, thus achieving the effect of saving resources.

In an embodiment, referring to FIG. 1, the first terminal element 11 includes N first conductive leads 111, and first ends of the N first conductive leads 111 pass through the middle clip 12. The first terminal module 1 further includes a first module housing 14, the first module housing 14 is injection molded on parts of the N first conductive leads 111 and the middle clip 12, and parts of the N first conductive leads 111 extend out of the first module housing 14; the second terminal element 21 includes N second conductive leads 211; the second terminal module 2 further includes a second module housing 23, the second module housing 23 is injection molded to parts of the N second conductive leads 211, and parts of the N second conductive lead 211 extend out of the second module housing 23; terminal housing 3 is injection molded on the stacked first module housing 14 and second module housing 23, and the middle clip 12 separates the N first conductive lead 111 and N second conductive lead 211.

As an example, it is mentioned that the first ends of the N first conductive leads 111 pass through the middle clip 12; the first module housing 14 is injection molded on the parts of the N first conductive leads 111 and the middle clip 12 to form first terminal module 1, and the parts of the N first conductive leads 111 extend out of the first module housing 14 to form N first PINs 13. Second module housing 23 is injection molded to parts of the N second conductive leads 211 to form second terminal module 2, and parts of the N second conductive leads 211 extend out of the second module housing 23 to form N second PINs 22. Terminal housing 3 is injection molded on the stacked first module housing 14 and second module housing 23 to form a Type-C plug-in terminal. The middle clip 12 separates the N first conductive leads 111 and the N second conductive leads 211, and the N first PINs 13 and the N second PINs 22 are arranged in a display mode to form a connection terminal for plugging on the PCB board 4. In this way, the installation mode of the application is that the Type-C plug terminal formed by the first terminal module 1 and the second terminal module 2 is directly plugged into the PCB board 4 through the connecting terminal, which is simpler and more convenient compared with the chip-mounted mode, and can shorten the technological process of product manufacturing and the assembly production line accordingly. Meanwhile, the usage of PCB board 4 is reduced, thus achieving the effect of saving resources.

In an embodiment, referring to FIG. 1, the first conductive lead 111 includes a first connecting part 1111, a first bending part 1112 and a second connecting part 1113, and the first connecting parts 1111 of the N first conductive leads 111 penetrate through the middle clip 12; the first module housing 14 includes a first injection molded part 141 and a second injection molded part 142; the first injection molded part 141 is injection molded on all of the first connecting part 1111 of the N first conductive leads 111 and the middle clip 12; the second injection molded part 142 is injection molded on a part of the second connecting part 1113 of the N first conductive leads 111 close to the first bending part 1112, so that parts of the second connecting parts 1113 extend out of the second injection molded parts 142 to form N first PINs 13; the second conductive lead 211 includes a third connecting part 2111, a second bending part 2112 and a fourth connecting part 2113; and the second module housing 23 includes a third injection molded part 231 and a fourth injection molded part 232; the third injection molded part 232 is injection molded on a part of the third connecting part 2111 of the N second conductive leads 211 close to the second bending part 2112; the fourth injection molded part 232 is injected into a part of the fourth connecting part 2113 of the N second conductive leads 211 close to the second bending part 2112, so that parts of the fourth connecting parts 2113 extend out of the fourth injection molded parts 232 to form N second PINS 22.

As an example, the first conductive lead 111 includes a first connecting part 1111, a first bending part 1112 and a second connecting part 1113. The first connecting parts 1111 of the N first conductive leads 111 pass through the middle clip 12 to form an assembly. The first module housing 14 includes a first injection molded part 141 and a second injection molded part 142. The first injection molded part 141 is injection molded on all the first connecting part 1111 of the N first conductive leads 111 and the middle clip 12; the second injection molded part 142 is injection molded on the part where the second connecting part 1113 of the first conductive lead 111 is close to the first bending part 1112; the first injection molded part 141 and the second injection molded part 142 are bent and the carrier is removed based on the first bending part 1112 to form a first terminal module 1 with the required shape. The part of the second connecting part 1113 extending from the second injection molded part 142 forms N first PINs 13, and the N first PINs 13 of the first terminal module 1 are plugged on the PCB board 4. The second conductive lead 211 includes a third connecting part 2111, a second bending part 2112 and a fourth connecting part 2113. The second module housing 23 includes a third injection molded part 231 and a fourth injection molded part 232. The third injection molded part 231 is injection molded on the part of the third connecting part 2111 of the second conductive lead 211 close to the second bending part 2112, the fourth injection molded part 232 is injection molded on the part of the fourth connecting part 2113 of the second conductive lead 211 close to the second bending part 2112, the third injection molded part 231 and the fourth injection molded part 232 are bent and the carrier is removed based on the second bending part 2112 to form a second terminal module 2 with the required shape. The part of the fourth connecting part 2113 extending from the fourth injection molded part 232 forms N second PINs 22, and the N second PINs of the second terminal module 2 are plugged on the PCB board 4.

In an embodiment, referring to FIG. 1, the connection terminal includes a Type-C10 terminal, and the N first PINs 13 and the N second PINs 22 include a differential signal PIN, a power positive PIN and a ground PIN which are arranged in groups. Alternatively, the connection terminal includes a Type-C6 terminal, and the N first PINs 13 and the N second PINs 22 include a differential signal PIN, a power positive PIN and a ground PIN which are arranged in groups.

As an example, at present, the connection terminals of Type-C in the market are all 16-terminal or 24-terminal chip-mounted type, which are used in the charger of terminal, and all of them are brushed with solder paste and then reflowed, and multilayer board is adopted for PCB board 4. Referring to FIG. 4, it can be seen that the functions of 24 terminals, in which A2, A3, A10, A11/B2, B3, B10 and B11 are used for high-speed transmission rate. Generally, for 20G/40G, transmission by these pairs of terminals is useless for the charger. Therefore, if the charger uses a 24-terminal chip-mounted Type-C, the 14 terminals A1, A2, A3, A4, A8, A10, A11/B1, B2, B3, B4, B8, B10 and B11 are redundant and useless. If the charger uses a 16-terminal chip-mounted Type-C, it is useless to have 6 terminals. In this example, the connection terminals include Type-C10 terminals, and the N first PINs 13 and N second PINs 22 include differential signal PINS, USB positive PIN, USB negative PIN, power positive PIN and ground pin arranged in groups. It can meet the functions of fast charging and terminal discrimination of the charger, that is, it can perfectly replace 2.0 USB, meet all the functions of the charger, and also respond to the requirements of EU standards, improve production efficiency and improve product quality.

In this example, the connection terminals also include Type-C6 terminals. The N first PINs 13 and N second PINs 22 include differential signal PIN, power positive PIN and ground PIN which are arranged in groups. The Type-C6 terminal is 4 terminals less than the Type-C10 terminal, which only meets the charger with low current. This can give users more choices and is more advantageous than the Type-C10 terminal in cost. Moreover, this product takes up less space of PCBA, and the space utilization rate of PCB board is greater, so the whole product is smaller in size.

In this example, after the connection terminal of Type-C is plugged into the PCB board 4 with a single panel, they are welded and fixed by general wave soldering, which meets the requirements of fast charging and data of the charger, reduces the number of terminals of Type-C, improves the production efficiency, and the depth of the connection terminals plugged into the PCB board 4 can be adjusted according to user's requirements, so that the appearance is more beautiful and neat and the product quality is improved. It can also replace the existing 2.0 USB, making the charger more beautiful and compact, and save resources.

The embodiment of the application provides a manufacturing method of a Type-C plug terminal, as shown in FIGS. 1 and 4, it includes:

- S11: injection molding a first terminal element 11 and a middle clip 12 to obtain a first terminal module 1;
- S12: injection molding a second terminal element 21 to obtain a second terminal module 2;
- S13: injection molding the stacked first terminal module 1 and the second terminal module 2 to obtain a terminal housing 3, and a part of the first terminal module 1 extending out of the terminal housing 3 forms N first PINs 13, a part of the second terminal module 2 extending out of the terminal housing 3 forms N second PINs 22, the N first PINs 13 and the N second PINs 22 are arranged in a display mode to form a connection terminal for plugging into a PCB board 4, and N≥3.

As an embodiment, first, the first module housing 14 is injection molded on the parts of the N first conductive leads 111 and the middle clip 12 to form the first terminal module 1, and the parts of the N first conductive leads 111 extend out of the first module housing 14 to form N first PINs 13; the second module housing 23 is injection molded to the parts of the N second conductive leads 211 to form the second terminal module 2, and parts of the N second conductive leads 211 extend out of the second module housing 23 to form N second PINs 22. Then, the terminal housing 3 is injection molded on the stacked first module housing 14 and second module housing 23 to form a Type-C plug terminal. The middle clip 12 separates the N first conductive leads 111 and the N second conductive leads 211, and the N first PINs 13 and the N second PINs 22 are arranged in a display mode to form a connection terminal for plugging into the PCB board 4.

In this example, the connection terminals include Type-C10 terminals or Type-C6 terminals. After the connection terminal of Type-C is plugged into the PCB board 4 with a single panel, they are welded and fixed by general wave soldering, which meets the requirements of fast charging and data of the charger, reduces the number of terminals of Type-C, improves the production efficiency, and the depth of the connection terminals plugged into the PCB board 4 can be adjusted according to user's requirements, so that the appearance is more beautiful and neat and the product quality is improved. It can also replace the existing 2.0 USB, making the charger more beautiful and compact, and save resources.

In an embodiment, as shown in FIG. 1, the first terminal element 11 includes N first conductive leads 111, a first carrier 112 connected to a first end of the first conductive lead 111, and a second carrier 113 connected to a second end of the first conductive lead 111. The second terminal element 21 includes N second conductive leads 211, a third carrier 212 connected to a first end of the second conductive lead 211, a fourth carrier 213 connected to a second end of the second conductive leads 211.

The step of injection molding a first terminal element 11 and a middle clip 12 to obtain a first terminal module 1 includes:

the first ends of the N first conductive leads 111 and the first carrier 112 penetrate through the middle clip 12, injection molding parts of the N first conductive leads 111 and the middle clip 12 to form a first module housing 14; parts of the N first conductive leads 111 extend out of the first module housing 14 to form a first component, and removing the carrier from the first component to form the first terminal module 1;

the step of injection molding a second terminal element 21 to obtain a second terminal module 2 includes:

injection molding parts of the N second conductive leads 211 to form a second module housing 23; parts of the N second conductive leads 211 extend out of the second module housing 23 to form a second component, and removing the carrier from the second component to form the second terminal module 2;

the step of injection molding the stacked first terminal module 1 and the second terminal module 2 to obtain a terminal housing 3 includes:

The first terminal module 1 and the second terminal module 2 are stacked so that the middle clip 12 separates the N first conductive leads 111 and the N second conductive leads 211. Injection molding the stacked first terminal module 1 and second terminal module 2 to obtain terminal housing 3.

As an example, the first terminal element 11 includes N first conductive leads 111, a first carrier 112 and a second carrier 113. The first carrier 112 is connected to the first end of first conductive lead 111, the second carrier 113 is connected to the second end of first conductive lead 111. The first ends of the N first conductive leads 111 and the first carrier 112 pass through the middle clip 12, and parts of the N first conductive leads 111 and the middle clip 12 are injection molded to form the first module housing 14. Parts of the N first conductive leads 111 extend out of the first module housing 14 to form a first component, and the carrier is removed from the first component to form a first terminal module 1;

The second terminal element 21 includes N second conductive leads 211, a third carrier 212 and a fourth carrier 213, and the third carrier 212 is connected to the first ends of the N second conductive leads 211. The fourth carrier 213 is connected to the second ends of the N second conductive leads 211; parts of the N second conductive leads 211 are injection molded to form a second module housing 23; parts of the N second conductive lead 211 extend out of the second module housing 23 to form a second component, and the carrier is removed from the second component to form a second terminal module 2. The first terminal module 1 and the second terminal module 2 are stacked so that the middle clip 12 separates the N first conductive leads 111 and N second conductive leads 211. Injection molding the stacked first terminal module 1 and second terminal module 2 to obtain terminal housing 3, and part of the first terminal module 1 extend out of the terminal housing 3 to form N first PINs 13, part of the second terminal module 2 extend out of the terminal housing 3 to form N second PINs 22, and the N first PINs 13 and the N second PINs 22 are arranged in a display mode to form a connection terminal for plugging into the PCB board 4. Compared with the chip-mounted mode, it is simpler and more convenient, which can shorten the technological process of product manufacturing and shorten the assembly production line accordingly.

The embodiment of the application provides a Type-C connector, as shown in FIG. 2, FIG. 3, FIG. 6 and FIG. 7, including a Type-C plug terminal, a protective case 5 and a PCB board 4. A plug pin 51 is arranged on the protective case 5, and the plug pin 51 is plugged on the PCB board 4 to form an accommodating space. The Type-C plug terminal is assembled in the accommodating space, and the connection terminal of the Type-C plug terminal is plugged on the PCB board 4.

As an example, the Type-C connector includes a Type-C plug terminal, a protective case 5 and a PCB board 4, wherein the protective case 5 is provided with a plug pin 51, and the plug pin 51 is plugged on the PCB board 4 to form an accommodating space. The Type-C plug terminal is assembled in the accommodating space, and the connection terminal of the Type-C plug terminal is plugged on the PCB 4. In this way, the Type-C plug terminal can be conveniently installed on the PCB 4, and the accommodating space formed by the cooperation of the protective case 5 and the PCB 4 can ensure the firm and safe installation of the Type-C plug terminal. The size of the accommodating space can also be adjusted according to the actual demand, so as to adapt to the height of the Type-C, meet the requirements of users, facilitate the placement of the Type-C plug terminal in the center, and make the appearance more beautiful and neat.

In this example, after the connection terminal of Type-C is plugged into the PCB board 4, they are welded and fixed by general wave soldering, which meets the requirements of fast charging and data of the charger, reduces the number of terminals of Type-C, improves the production efficiency, and the depth of the connection terminals plugged into the PCB board 4 can be adjusted according to user's requirements, so that the appearance is more beautiful and neat and the product quality is improved. It can also replace the existing 2.0 USB, making the charger more beautiful and compact, convenient for users to carry, greatly enhancing the user experience, and can save resources.

Figure 6:
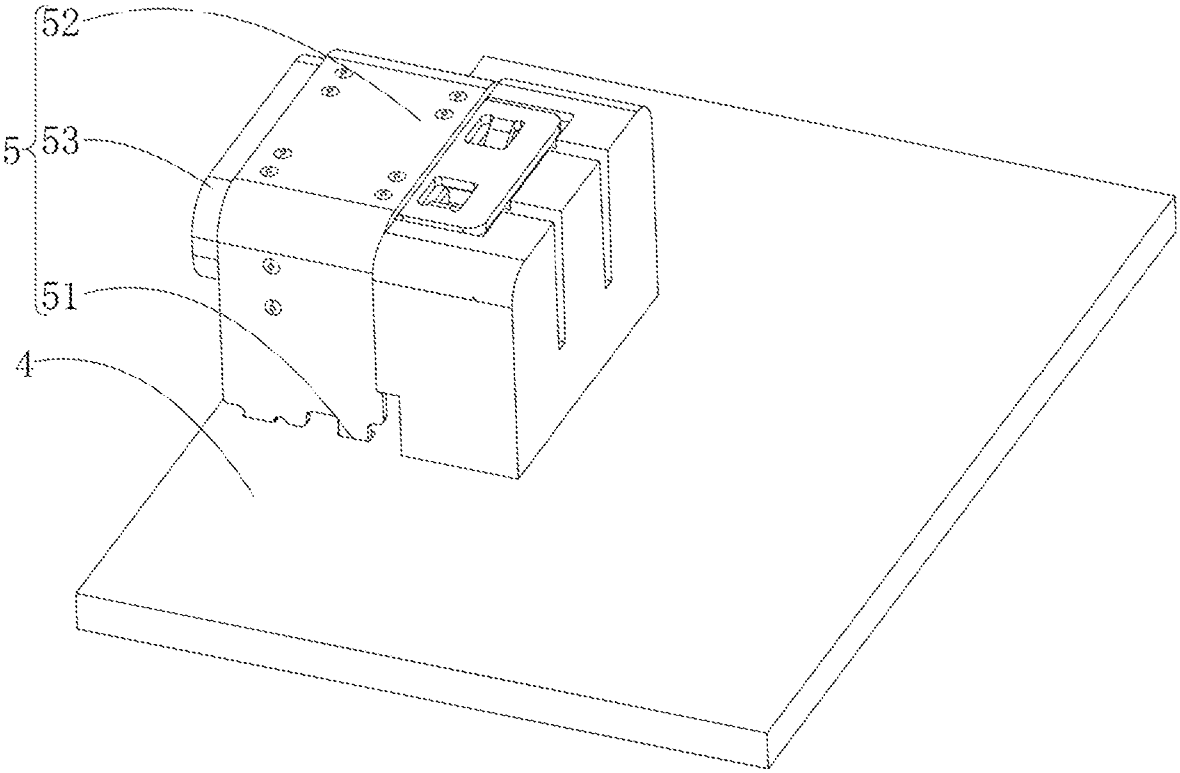
FIG. 6 is an isometric view of a Type-C connector of the present application from a first perspective.

In an embodiment, as shown in FIG. 6, the protective case 5 includes a U-shaped housing 52 and an inner sleeve 53 embedded in the U-shaped housing 52, the Type-C plug terminal is installed in the U-shaped housing 52, and one end of the Type-C plug terminal away from the connection terminal passes through the inner sleeve 53; a plug pin 51 is arranged on the U-shaped housing 52, and the plug pin 51 is plugged on the PCB board 4.

As an example, the protective case 5 includes a U-shaped housing 52 and an inner sleeve 53. The inner sleeve 53 is made into a cylindrical sheath by drawing process, and the inner sleeve 53 is embedded in the U-shaped housing 52 by laser welding. The Type-C plug terminal is installed in U-shaped housing 52, and the end of the Type-C plug terminal away from the connecting terminal penetrates in the inner sleeve 53, which has a good protective effect on the Type-C plug terminal. In this embodiment, the PCB board 4 adopts a single panel. The plug pin 51 of the protective case 4 is installed on the PCB board 4, and finally fixed by wave soldering. For this plug-in Type-C, the height of the Type-C may be adjusted according to the actual needs, thus meeting the requirements of users, facilitating the center placement of the Type-C plug terminal. The appearance is more beautiful and neat, and the process is simple and the material cost is low.

In an embodiment, as shown in FIG. 6, the U-shaped housing 52 includes a first U-shaped plate 521, a second U-shaped plate 522 extending horizontally from one edge of the first U-shaped plate 521 and a third U-shaped plate 523 extending horizontally from one edge of the second U-shaped plate 522, and the inner sleeve 53 is embedded in the first U-shaped plate 521; the first U-shaped plate 521 and the second U-shaped plate 522 cover the Type-C plug terminal, and the third U-shaped plate 523 is bent relative to the second U-shaped plate 522 to limit the Type-C plug terminal; two support arms of the first U-shaped plate 521 extend along opening end of the first U-shaped plate 521 to obtain the plug pin 51.

As an example, the protective case 5 includes the first U-shaped plate 521, the second U-shaped plate 522 and the third U-shaped plate 523. The second U-shaped plate 522 extends horizontally from one edge of the first U-shaped plate 521, the third U-shaped plate 523 extends horizontally from one edge of the second U-shaped plate 522, and the inner sleeve 53 is embedded in the first U-shaped plate 521. The first U-shaped plate 521 and the second U-shaped plate 522 cover the Type-C plug terminal, and the third U-shaped plate 523 is bent relative to the second U-shaped plate 522 to limit the Type-C plug terminal and ensure the safety and reliability of equipment assembly; two support arms of the first U-shaped plate 521 extend along opening end of the first U-shaped plate 521 to obtain the plug pin 51. Among them, the connection terminal of the plug pin 51 and the Type-C plug terminal are parallel to each other, which is convenient for plugging the protective case 4 on the PCB board 4 through the plug pin 51.

Figure 7:
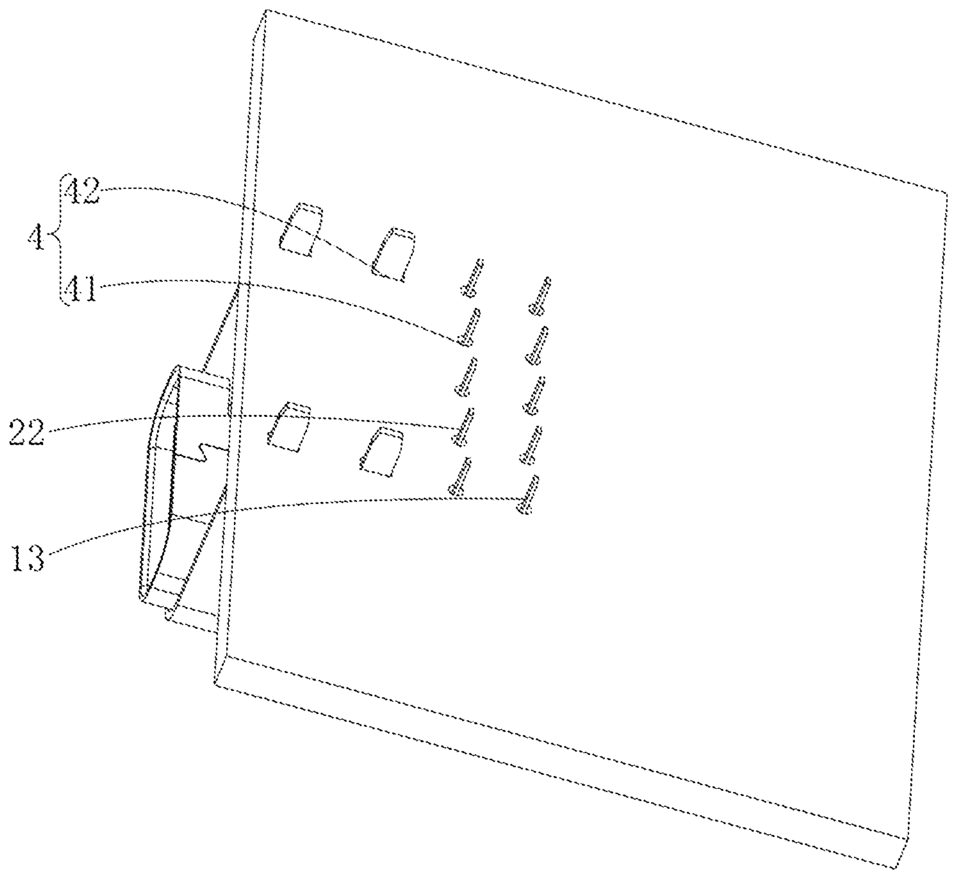
FIG. 7 is an isometric view of a Type-C connector of the present application from a second perspective.

In an embodiment, as shown in FIG. 7, the PCB board 4 is provided with a first mounting hole 41 corresponding to the connection terminal and a second mounting hole 42 corresponding to the plug pin 51. The connection terminal of the Type-C plug terminal is plugged into the first mounting hole 41; the plug pin 51 of the protective case 5 is plugged into the second mounting hole 42.

As an embodiment, the PCB board 4 is provided with the first mounting hole 41 and the second mounting hole 42, and the first mounting hole 41 corresponds to the connection terminal, which is convenient to plug the connection terminal of the Type-C plug terminal into the first mounting hole 41. The second mounting hole 42 corresponds to the plug pin 51, which is convenient to plug the plug pin 51 of the protective case 5 into the second mounting hole 42. This arrangement is convenient to plug the Type-C plug terminal and the protective case 5 into the PCB board 4, which is simpler and more convenient than the chip-mounted method. In this way, the technological process of product manufacturing is shortened and so as the assembly production line. At the same time, the usage of PCB board 4 is reduced, thus achieving the effect of saving resources.

In this embodiment, the distance between the axial center line of the Type-C plug terminal and the axis of the upper surface of the PCB board 4 is 5.2~5.3 mm, by adjusting the length of the connection terminal of the Type-C plug terminal in the first mounting hole 41 and the plug pin 51 of the protective case 5 in the second mounting hole 42, the distance between the axial center line of the Type-C plug terminal and the axis of the upper surface of the PCB board 4 can be adjusted to meet user requirements.

Figure 2:
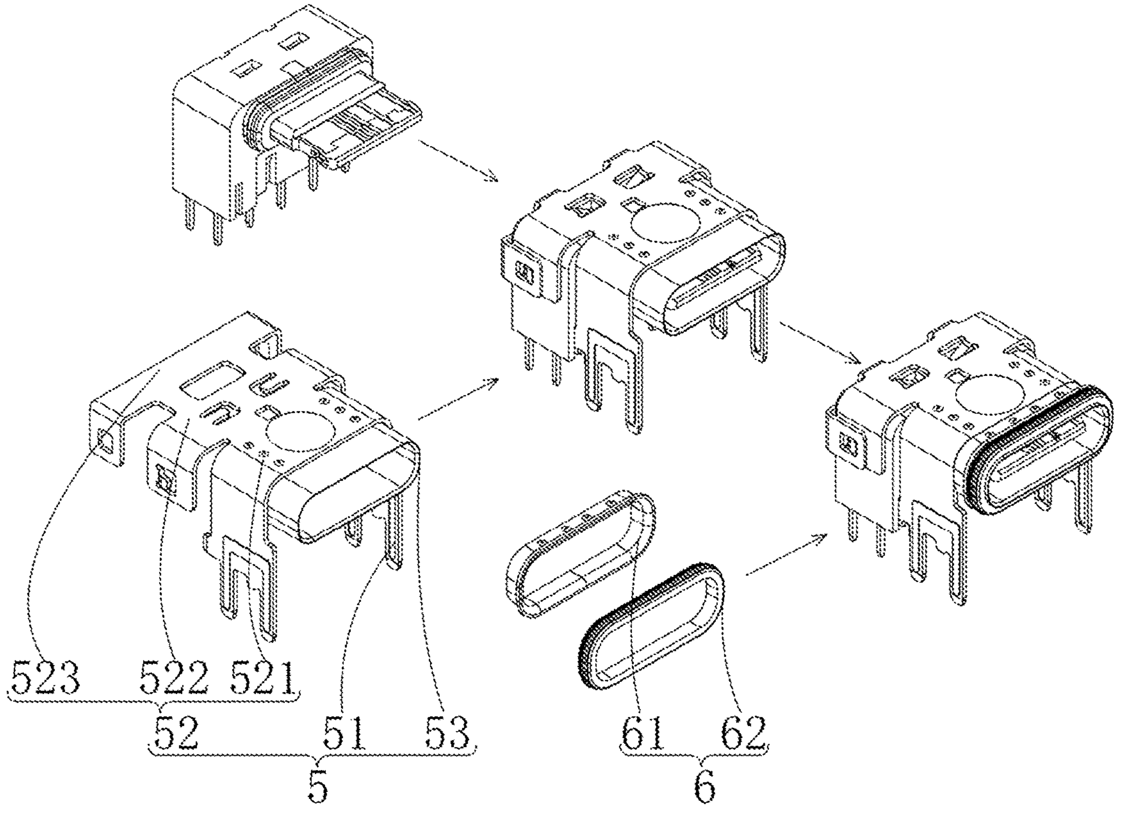
FIG. 2 is a manufacturing step diagram of a Type-C connector of the present application.
Figure 3:
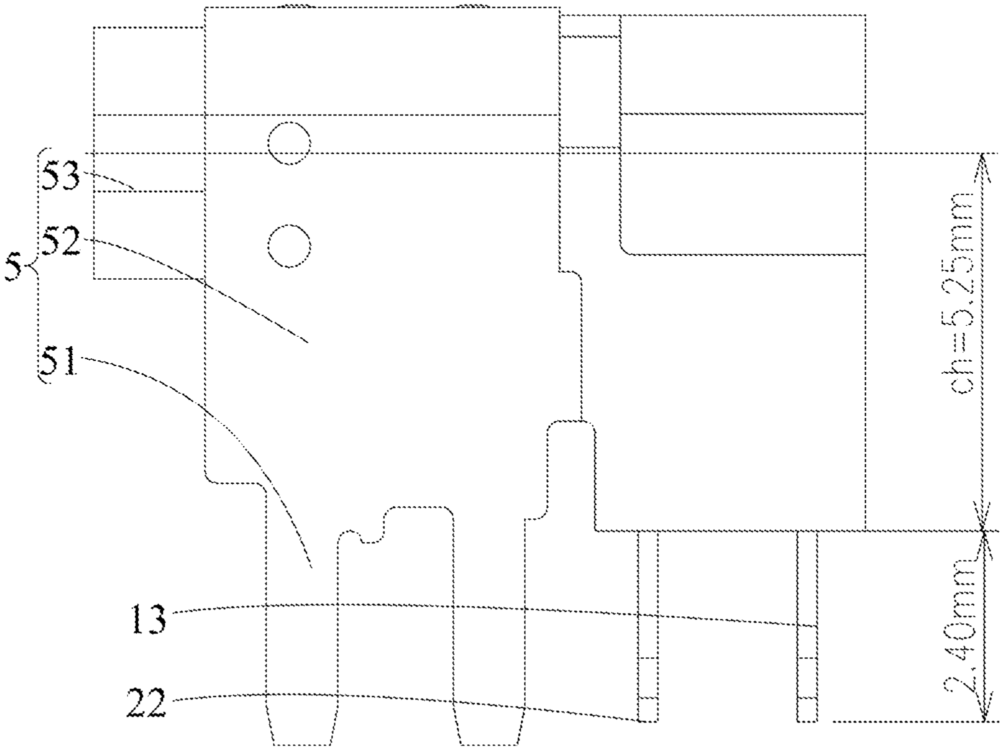
FIG. 3 is a sectional view of a Type-C plug terminal of the present application.

In an embodiment, as shown in FIG. 2, the Type-C connector further includes a waterproof component 6, which includes a waterproof housing 61 and a waterproof ring 62. A waterproof sleeve is sleeved at one end of the Type-C plug terminal away from the connecting terminal, and the waterproof sleeve is connected with the first U-shaped plate 521. The waterproof housing 61 is sleeved on the first U-shaped plate 521, and the waterproof housing 61 is connected with the waterproof sleeve, and the waterproof ring 62 is sleeved in the waterproof housing 61.

As an embodiment, the waterproof component 6 includes a waterproof housing 61 and a waterproof ring 62. Firstly, a waterproof sleeve is sleeved at one end of the Type-C plug terminal away from the connecting terminal, so that the waterproof sleeve is connected with the first U-shaped plate 521 to protect the Type-C plug terminal from water. The waterproof housing 61 is sleeved on first U-shaped plate 521, and the waterproof housing 61 is connected with the waterproof sleeve, and then the waterproof ring 62 is sleeved in waterproof housing 61. In this way, the waterproof ring 62 is matched with the waterproof sleeve, which can prevent liquid from entering into the Type-C connector, make the Type-C connector have good waterproof performance, and prolong the service life of equipment.

In this embodiment, as shown in FIGS. 2, 6 and 7, firstly, the inner sleeve 53 is embedded in the first U-shaped plate 521 of the U-shaped housing 52 to form a protective case 5; remove the middle clip to obtain a Type-C plug terminal to be installed; cover around the Type-C plug terminal to be installed with the first U-shaped plate 521 of U-shaped housing 52 and the second U-shaped plate 522 of U-shaped housing 52, and the end of the Type-C plug terminal to be installed, which is away from the connecting terminal, penetrates into the inner sleeve 53 to form a Type-C assembly; bend the third U-shaped plate 523 of U-shaped housing 52 relative to the second U-shaped plate 522 for limiting the Type-C plug terminal to be installed; provide a first mounting hole 41 and second mounting hole 42 on the PCB board 4; plug the connection terminal of the Type-C plug terminal into the first mounting hole 41; provide a plug pin 51 on the first U-shaped plate 521 of the protective case 5; plug the plug pin 51 of protective case 5 into the second mounting hole 42 to form a Type-C connector.

In this example, after the connection terminal of the Type-C plug terminal and the plug pin 51 of the protective case 5 are plugged on the PCB board 4, they are welded and fixed by general wave soldering, which meets the requirements of fast charging and data of the charger, reduces the number of terminals of Type-C, improves the production efficiency, and the depth of the connection terminals plugged into the PCB board 4 can be adjusted according to user's requirements, so that the appearance is more beautiful and neat and the product quality is improved. It can also replace the existing 2.0 USB, making the charger more beautiful and compact, convenient for users to carry, greatly enhancing the user experience, and can save resources.

The embodiment of the application provides a charger, which includes a Type-C connector.

As an embodiment, the currently available Type-C devices are all chip-mounted. The connection mode between terminal module and PCB board is: solder paste is brushed and then reflowed, and multilayer board is adopted for matching PCB board. This leads to high production cost and complicated process, thus affecting production efficiency. In this embodiment, the Type-C plug terminal includes a first terminal module 1, a second terminal module 2 and a terminal housing 3. The first terminal module 1 is injection molded by using a first terminal element 11 and a middle clip 12, and the second terminal module 2 is injection molded by using a second terminal element 21. The first terminal element 11 and the second terminal element 21 are used as the metal conductive parts inside the Type-C plug terminal, the middle clip 12 includes a connecting part and carrier part. The connecting part is arranged between the first terminal element 11 and the second terminal element 21, which plays a separating role. As a handheld part, the carrier part provides convenience for user to pick up the Type-C plug terminal. The first terminal module 1 and the second terminal module 2 are matched and combined to form a complete Type-C plug terminal. Injection molding the stacked first terminal module 1 and the second terminal module 2 to obtain a terminal housing 3, and a part of the first terminal module 1 extending out of the terminal housing 3 forms N first PINs 13, a part of the second terminal module 2 extending out of the terminal housing 3 forms N second PINs 22, the N first PINs 13 and the N second PINs 22 are arranged in a display mode to form a connection terminal for plugging into a PCB board 4. In this way, the installation mode of the application is that the Type-C plug terminal formed by the first terminal module 1 and the second terminal module 2 is directly plugged into the PCB board 4 through the connecting terminal, which is simpler and more convenient compared with the chip-mounted mode, and can shorten the technological process of product manufacturing and the assembly production line accordingly. Meanwhile, the usage of PCB board 4 is reduced, thus achieving the effect of saving resources.

In this embodiment, the Type-C connector includes a Type-C plug terminal, a protective case 5 and a PCB board 4. The inner sleeve 53 is embedded in the first U-shaped plate 521 of the U-shaped housing 52 to form a protective case 5; remove the middle clip to obtain a Type-C plug terminal to be installed; cover around the Type-C plug terminal to be installed with the first U-shaped plate 521 of U-shaped housing 52 and the second U-shaped plate 522 of U-shaped housing 52, and the end of the Type-C plug terminal to be installed, which is away from the connecting terminal, penetrates into the inner sleeve 53 to form a Type-C assembly; bend the third U-shaped plate 523 of U-shaped housing 52 relative to the second U-shaped plate 522 for limiting the Type-C plug terminal to be installed; provide a first mounting hole 41 and second mounting hole 42 on the PCB board 4; plug the connection terminal of the Type-C plug terminal into the first mounting hole 41; provide a plug pin 51 on the first U-shaped plate 521 of the protective case 5; plug the plug pin 51 of protective case 5 into the second mounting hole 42 to form a Type-C connector.

In this example, after the connection terminal of the Type-C plug terminal and the plug pin 51 of the protective case 5 are plugged on the PCB board 4, they are welded and fixed by general wave soldering, which meets the requirements of fast charging and data of the charger, reduces the number of terminals of Type-C, improves the production efficiency, and the depth of the connection terminals plugged into the PCB board 4 can be adjusted according to user's requirements, so that the appearance is more beautiful and neat and the product quality is improved. It can also replace the existing 2.0 USB, making the charger more beautiful and compact, convenient for users to carry, greatly enhancing the user experience, and can save resources.

The above are merely the preferred embodiments of this application, and are not intended to limit the application. Any modification, equivalent substitution and improvement made within the spirit and principle of this application shall be included in the protection scope of this application.

What is claimed is:

1. A Type-C plug terminal, comprising a first terminal module, a second terminal module and a terminal housing;

- the first terminal module is injection molded by using a first terminal element and a middle clip;
- the second terminal module is injection molded by using a second terminal element; and
- the terminal housing is injection molded on the stacked first terminal module and the second terminal module, and a part of the first terminal module extending out of the terminal housing forms N first PINs, a part of the second terminal module extending out of the terminal housing forms N second PINs, the N first PINs and the N second PINs are arranged in a display mode to form a connection terminal for plugging into a PCB board, and N≥3;
- the middle clip comprises a connecting part and a carrier part, the connecting part is arranged between the first terminal element and the second terminal element, the carrier part serves as a handheld part;
- the connection terminal comprises a Type-C10 terminal, and the N first PINs and the N second PINs comprise a differential signal PIN, a USB positive PIN, a USB negative PIN, a power positive PIN and a ground pin which are arranged in groups; or
- the connection terminal comprises a Type-C6 terminal, and the N first PINs and the N second PINs comprise a differential signal PIN, a power positive PIN and a ground PIN which are arranged in groups.

2. The Type-C plug terminal of claim 1, wherein the first terminal element comprises N first conductive leads, and a first ends of the N first conductive leads penetrate through the middle clip; the first terminal module further comprises a first module housing, the first module housing is injection molded on the partial N first conductive leads and the middle clip, and parts of the N first conductive leads extend out of the first module housing;

the second terminal element comprises N second conductive leads; the second terminal module further comprises a second module housing, the second module housing is injection molded on the partial N second conductive leads, and parts of the N second conductive leads extend out of the second module housing; and the terminal housing is injection molded on the stacked first module housing and second module housing, and the middle clip separates the N first conductive leads and N second conductive leads.

3. The Type-C plug terminal of claim 2, wherein the first conductive lead includes a first connecting part, a first bending part and a second connecting part, and the first connecting parts of the N first conductive leads penetrate through the middle clip;

the first module housing comprises a first injection molded part and a second injection molded part; the first injection molded part is injection molded on all of the first connecting part of the N first conductive leads and the middle clip; the second injection molded part is injection molded on a part of the second connecting part of the N first conductive leads close to the first bending part, so that parts of the second connecting parts extend out of the second injection molded parts to form N first PINS;

the second conductive lead comprises a third connecting part, a second bending part and a fourth connecting part; and the second module housing comprises a third injection molded part and a fourth injection molded part; the third injection molded part is injection molded on a part of the third connecting part of the N second conductive leads close to the second bending part; the fourth injection molded part is injected into a part of the fourth connecting part of the N second conductive leads close to the second bending part, so that parts of the fourth connecting parts extend out of the fourth injection molded parts to form N second PINs.

4. A manufacturing method of the Type-C plug terminal of claim 1, comprising:

injection molding a first terminal element and a middle clip to obtain a first terminal module;

injection molding a second terminal element to obtain a second terminal module;

injection molding the stacked first terminal module and the second terminal module to obtain a terminal housing, and a part of the first terminal module extending out of the terminal housing forms N first PINs, a part of the second terminal module extending out of the terminal housing forms N second PINs, the N first PINs and the N second PINs are arranged in a display mode to form a connection terminal for plugging into a PCB board, and N≥3.

5. The manufacturing method of claim 4, wherein the first terminal element comprises N first conductive leads, a first carrier connected to a first end of the first conductive lead, and a second carrier connected to a second end of the first conductive lead;

the second terminal element comprises N second conductive leads, a third carrier connected to a first end of the second conductive lead, and a fourth carrier connected to a second end of the second conductive lead;

the step of injection molding a first terminal element and a middle clip to obtain a first terminal module comprises:

the first ends of the N first conductive leads and the first carrier penetrate through the middle clip, injection molding parts of the N first conductive leads and the middle clip to form a first module housing; parts of the N first conductive leads extend out of the first module housing to form a first component, and removing the carrier from the first component to form the first terminal module;

the step of injection molding a second terminal element to obtain a second terminal module comprises:

injection molding parts of the N second conductive leads to form a second module housing; parts of the N second conductive leads extend out of the second module housing to form a second component, and removing the carrier from the second component to form the second terminal module;

the step of injection molding the stacked first terminal module and the second terminal module to obtain a terminal housing comprises:

stacking the first terminal module and the second terminal module so that the middle clip separates the N first conductive leads and N second conductive leads, and injection molding the stacked first terminal module and second terminal module to obtain a terminal housing.

6. A Type-C connector, comprising the Type-C plug terminal of claim 1, a protective case and a PCB board;

the protective case is provided with a plug pin, and the plug pin is plugged onto the PCB board to form an accommodating space; and the Type-C plug terminal is assembled in the accommodating space, and the connection terminal of the Type-C plug terminal is plugged onto the PCB board.

7. The Type-C connector of claim 6, wherein the protective case comprises a U-shaped housing and an inner sleeve embedded in the U-shaped housing, the Type-C plug terminal is installed in the U-shaped housing, and one end of the Type-C plug terminal away from the connection terminal penetrates through the inner sleeve; and the U-shaped housing is provided with a plug pin, and the plug pin is plugged onto the PCB board.

8. The Type-C connector of claim 7, wherein the U-shaped housing comprises a first U-shaped plate, a second U-shaped plate extending horizontally from one edge of the first U-shaped plate, and a third U-shaped plate extending horizontally from one edge of the second U-shaped plate; the inner sleeve is embedded in the first U-shaped plate;

the first U-shaped plate and the second U-shaped plate cover the Type-C plug terminal, and the third U-shaped plate is bent relative to the second U-shaped plate for limiting the Type-C plug terminal; and two support arms of the first U-shaped plate extend along opening end of the first U-shaped plate to obtain the plug pin.

9. The Type-C connector of claim 8, wherein the PCB board is provided with a first mounting hole corresponding to the connection terminal and a second mounting hole corresponding to the plug pin; and the connection terminal of the Type-C plug terminal is plugged into the first mounting hole;

the plug pin of the protective case is plugged into the second mounting hole.

10. The Type-C connector of claim 8, wherein the Type-C connector further comprises a waterproof component, the waterproof component comprises a waterproof housing and a waterproof ring;

a waterproof sleeve is sleeved at one end of the Type-C plug terminal away from the connecting terminal, and the waterproof sleeve is connected with the first U-shaped plate; and the waterproof housing is sleeved on the first U-shaped plate, the waterproof housing is connected with the waterproof sleeve, and the waterproof ring is sleeved in the waterproof housing.

11. A charger, comprising the Type-C connector of claim 6.

* * * * *